Patented Dec. 24, 1935

2,025,405

UNITED STATES PATENT OFFICE 2,025,405

METHOD OF PRODUCING WATER SOLUBLE COLLOIDAL MOLYBDENUM

Percy Vessie, Ossining, N. Y.

No Drawing. Application July 12, 1934,
Serial No. 734,800

8 Claims. (Cl. 167—72)

My invention relates to methods of producing water soluble coloidal molybdenum, and has particular reference to methods employing reduction of molybdenum oxides.

It has been established that water solutions of colloidal molybdenum possess certain very valuable pharmaceutical and bacteriological properties. In particular this substance is very effective in treatment of coccigenic infections.

I discovered that it is possible to obtain water soluble colloidal molybdenum in a stable form, by using a new method of reduction of molybdenum oxides. I found that formaldehydesodium-sulfoxylate can be used as a reduction agent, this substance having never been used before for the purpose of producing colloidal molybdenum.

Water suspension of molybdenum oxides is used for the reduction process in presence of some nontoxic, water soluble protective colloids, such as gum arabic, gelatin, etc. The reaction is usually conducted at the temperature of about 100° C. Under such conditions it flows quantitatively, and it takes from one to two hours for its completion. It should be noted, however, that formaldehydesodium sulfoxylate slowly reduces molybdenum oxides even at the room temperature.

When reducing, for instance, molybdenum trioxide by formaldehydesodiumsulfoxylate, the reaction is completed in one and one half hours. The product is obtained as a dark brown, sometimes almost black solution. Colloidal molybdenum may be precipitated from this solution by various organic solvents, such as ethyl or methyl alcohol, acetone, mixture of alcohol and ether, mixture of alcohol and acetone, etc.

It is also possible to obtain water soluble colloidal molybdenum as a dry powder, by directly evaporating the solution prepared by the above method. The evaporation may be conducted on a boiling water bath, or at the room temperature, over sulfuric acid in vacuo, for instance. In either case the colloidal molybdenum is obtained as an amorphous substance, often in the form of powder. Its color depends on the nature and quantity of the protective colloid used and varies from a dust-gray to black hue. This substance is highly stable and keeps for an indefinite length of time without any change. It completely dissolves in hot water.

The excess of formaldehydesodiumsulfoxylate can be completely removed by a thorough washing with ethyl or methyl alcohol, because the latter substances easily dissolve formaldehydesodiumsulfoxylate.

The product obtained by my method represents a stable, water soluble colloidal molybdenum possessing a negligible toxicity. Clinical observations have shown that daily injections—subcutaneous and intramuscular—of its solutions in ordinary doses (10 milligrams in 2 cc. of water) do not cause any concomitant reactions, either general or local.

Example I.—6 grams of finely ground molybdenum trioxide ($MoO_3$) is heated over a boiling water bath with 1% aqueous solution of 12 grams of gum arabic containing 12.78 grams of formaldehydesodiumsulfoxylate. In other words, 6 grams of $MoO_3$ is used with 1200 cc. of 1% aqueous solution of gum arabic. One unit by weight of $MoO_3$ requires from 2½ to 3 units of gum arabic. The resultant suspension is heated on a boiling water bath for two hours.

The originally pale-yellow color of the mixture turns to a dark-brown (black coffee) shade. The yield is almost quantitative. The hot mixture may be then filtered through a folded paper filter.

The resulting solution of colloidal molybdenum, after cooling, is poured with vigorous stirring into a mixture of 2000 cc. of anhydrous methyl alcohol and 1000 cc. of anhydrous ether. The mixture is left to stand for several hours in an ice box. Then it is sucked off on a Buechner funnel and thoroughly washed with anhydrous methyl alcohol and anhydrous ether in order to remove the excess of formaldehydesodiumsulfoxylate. The resulting dark-gray, dust-like, powder is dried in vacuo over sulfuric acid and paraffine. The yield is 14 to 15 grams.

Example II.—The colloidal solution of molybdenum obtained as per Example I, is subjected to evaporation until dry over a boiling water bath. The resulting product is ground into a fine powder and thoroughly washed with anhydrous methyl alcohol, then dried in a desiccator over sulfuric acid.

The colloidal solution of molybdenum in water may be used for subcutaneous or intramuscular injection in the cases described above, only when it is freshly prepared or kept in sealed containers. After standing for some length of time this solution precipitates colloidal molybdenum adsorbed by gum arabic.

The colloidal molybdenum powder, on the other hand, prepared by my method described in the Examples I and II, is stable and keeps for an indefinite length of time. For dissolving this preparation in water it is necessary to heat a mixture of the preparation with water, or even boil it in a test tube over open fire, for instance. Such boiling also serves to sterilize the preparation.

*Example III.*—10 grams of molybdenum trioxide are added to the solution of 40 grams of gelatine and 21.5 grams of formeldehydesodiumsulfoxylate in 2 liters of water. The resultant mixture is heated with a reflux condenser on a boiling water bath for two hours. It forms a dark-brown, almost black solution, which is subsequently evaporated in flat vessels at the room temperature. The remainder of water is finally removed by drying in vacuo over sulfuric acid. The drying continues until the weight becomes constant. The product represents a hard, solid, very dense conglomerate, difficult to grind into powder. It has a very dark, almost black color, and fully dissolves in hot water. In the above examples formaldehydesodiumsulfoxylate was used in excess of the theoretical requirements because a certain amount of it remaining in the product after reaction and after washing is not harmful, being non-toxic. Formaldehydesodiumsulfoxylate in time may become partly oxidized if the product is exposed to the air.

I claim as my invention:

1. A method of producing stable water soluble colloidal molybdenum containing admixture of formaldehydesodiumsulfoxylate, consisting in preparing water suspension of molybdenum oxides with a protective colloid dissolved in said suspension, treating it with formaldehydesodiumsulfoxylate, and separating the product in a solid state from the resultant solution.

2. A method of producing stable water soluble colloidal molybdenum containing admixture of formaldehydesodiumsulfoxylate, consisting in preparing water suspension of molybdenum oxides with a protective colloid dissolved in said suspension, and treating it with formaldehydesodiumsulfoxylate.

3. A method of producing stable water soluble colloidal molybdenum containing admixture of formaldehydesodiumsulfoxylate, consisting in preparing water suspension of molybdenum oxides with a protective colloid dissolved in said suspension, treating it with formaldehydesodiumsulfoxylate, and precipitating the solid product by organic solvents soluble in water.

4. A method of producing stable water soluble colloidal molybdenum containing admixture of formaldehydesodiumsulfoxylate, consisting in preparing water suspension of molybdenum oxides with a protective colloid dissolved in said suspension, treating it with formaldehydesodiumsulfoxylate, and separating the product by evaporating water from the resultant solution.

5. A method of producing water soluble colloidal molybdenum, consisting in preparing water suspension of molybdenum oxides with a protective colloid dissolved in said suspension, treating it with formaldehydesodiumsulfoxylate, and separating the resultant product from the solution in a solid state by evaporating water.

6. A method of producing water soluble colloidal molybdenum, consisting in preparing water suspension of molybdenum oxides with a protective colloid dissolved in said suspension, treating it with formaldehydesodiumsulfoxylate, separating the product in a solid state from the resultant solution, washing the product with alcohol and ether, and drying the washed product.

7. A method of producing water soluble colloidal molybdenum, consisting in preparing water suspension of molybdenum oxides with a protective colloid dissolved in said suspension, treating it with formaldehydesodiumsulfoxylate, and precipitating the product from the resultant solution by a solvent taken from a group consisting of alcohol, acetone, ether, and their mixtures.

8. As a medicinal preparation, a stable water-soluble colloidal molybdenum of low toxicity, containing admixtures of a non-toxic protective colloid and formaldehydesodiumsulfoxylate.

PERCY VESSIE.